US010328847B2

(12) United States Patent
Yang et al.

(10) Patent No.: US 10,328,847 B2
(45) Date of Patent: Jun. 25, 2019

(54) APPARATUS AND METHOD FOR IDENTIFYING A DRIVING STATE OF AN UNMANNED VEHICLE AND UNMANNED VEHICLE

(71) Applicant: Baidu Online Network Technology (Beijing) Co., Ltd., Beijing (CN)

(72) Inventors: Guang Yang, Beijing (CN); Kelei Li, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 0 days.

(21) Appl. No.: 15/605,699

(22) Filed: May 25, 2017

(65) Prior Publication Data
US 2018/0182186 A1 Jun. 28, 2018

(30) Foreign Application Priority Data

Dec. 22, 2016 (CN) .......................... 2016 1 1199483

(51) Int. Cl.
*B60Q 1/00* (2006.01)
*B60Q 1/26* (2006.01)
*B60Q 1/50* (2006.01)
*G07C 5/00* (2006.01)

(52) U.S. Cl.
CPC .............. *B60Q 1/2611* (2013.01); *B60Q 1/50* (2013.01); *G07C 5/00* (2013.01)

(58) Field of Classification Search
None
See application file for complete search history.

(56) References Cited

U.S. PATENT DOCUMENTS

| 4,600,913 | A | * | 7/1986 | Caine | B60Q 1/302 340/435 |
| 6,282,823 | B1 | * | 9/2001 | Brown | G09F 21/04 40/218 |
| 6,300,870 | B1 | * | 10/2001 | Nelson | B60Q 1/503 340/463 |
| 6,553,285 | B1 | * | 4/2003 | Bahmad | B60Q 1/503 116/42 |
| 6,940,422 | B1 | * | 9/2005 | Bachelder | G08G 1/087 340/906 |

(Continued)

*Primary Examiner* — Jonathan M Dager
(74) *Attorney, Agent, or Firm* — Knobbe Martens Olson & Bear LLP

(57) ABSTRACT

The present disclosure discloses an apparatus and a method for identifying a driving state of an unmanned vehicle, the identifying apparatus comprising: an information analyzing apparatus, configured to receive information of an operating system of the unmanned vehicle, and determine and transmit a corresponding driving state signal based on the information; and a display apparatus, configured to receive the driving state signal transmitted from the information analyzing apparatus and display the driving state signal. The identifying apparatus fully considers the driving conditions of various vehicles on the road and displays the driving state of the unmanned vehicle in an intuitive and eye-catching manner to the surrounding vehicles and pedestrians, improves the safety performance of road driving, and is simple in structure, easy to install, low in cost, suitable for mass promotion and use.

11 Claims, 2 Drawing Sheets

(56) References Cited

U.S. PATENT DOCUMENTS

| | | | |
|---|---|---|---|
| 7,095,318 B1* | 8/2006 | Bekhor | B60Q 1/26 340/464 |
| 7,629,898 B2* | 12/2009 | Kirkpatrick | G08G 1/0965 340/691.6 |
| 8,217,766 B2* | 7/2012 | Nakayama | B60Q 5/006 340/384.1 |
| 8,248,273 B2* | 8/2012 | Hayashi | G08G 1/04 340/435 |
| 8,514,100 B2* | 8/2013 | Yamashita | G08G 1/166 340/4.1 |
| 8,547,249 B2* | 10/2013 | David | G08G 1/166 340/435 |
| 8,606,430 B2* | 12/2013 | Seder | B60Q 1/268 340/425.5 |
| 8,854,229 B2* | 10/2014 | Kim | B60Q 5/006 340/901 |
| 8,954,252 B1* | 2/2015 | Urmson | G08G 1/166 180/167 |
| 9,196,164 B1 | 11/2015 | Urmson et al. | |
| 9,336,436 B1* | 5/2016 | Dowdall | G08G 1/166 |
| 9,340,178 B1* | 5/2016 | Khaykin | B60R 21/34 |
| 9,429,947 B1* | 8/2016 | Wengreen | B60W 30/06 |
| 9,513,632 B1* | 12/2016 | Gordon | G05D 1/0061 |
| 9,694,736 B2* | 7/2017 | Williams | B60Q 1/0094 |
| 9,878,659 B2* | 1/2018 | Williams | B60Q 1/50 |
| 9,881,503 B1* | 1/2018 | Goldman-Shenhar | G08G 1/166 |
| 9,902,311 B2* | 2/2018 | Sweeney | B60Q 1/2611 |
| 9,916,703 B2* | 3/2018 | Levinson | G01S 15/931 |
| 9,928,734 B2* | 3/2018 | Newman | B60Q 5/005 |
| 2001/0018641 A1* | 8/2001 | Kodaka | B62D 15/0265 701/301 |
| 2003/0132666 A1* | 7/2003 | Bond, III | B60T 7/22 303/193 |
| 2003/0149530 A1* | 8/2003 | Stopczynski | B60R 21/013 701/301 |
| 2004/0193347 A1* | 9/2004 | Harumoto | B60R 21/0132 701/45 |
| 2005/0083183 A1* | 4/2005 | Cao | B60Q 1/268 340/426.13 |
| 2005/0134441 A1* | 6/2005 | Somuah | B60Q 1/503 340/435 |
| 2005/0196020 A1* | 9/2005 | Comaniciu | G06K 9/00805 382/104 |
| 2006/0265918 A1* | 11/2006 | Meyer | G09F 19/08 40/411 |
| 2007/0032952 A1* | 2/2007 | Carlstedt | B60R 21/0134 701/301 |
| 2007/0040664 A1* | 2/2007 | Johnson | B60Q 1/444 340/467 |
| 2007/0222565 A1* | 9/2007 | Kawamata | B60R 21/0134 340/435 |
| 2008/0019567 A1* | 1/2008 | Takagi | G06K 9/00369 382/103 |
| 2008/0260208 A1* | 10/2008 | Nagaoka | G06K 9/00362 382/104 |
| 2009/0174573 A1* | 7/2009 | Smith | G08G 1/0962 340/905 |
| 2010/0256852 A1* | 10/2010 | Mudalige | G08G 1/163 701/24 |
| 2011/0090093 A1* | 4/2011 | Grimm | G01S 5/0072 340/901 |
| 2011/0140919 A1* | 6/2011 | Hara | B60Q 1/50 340/907 |
| 2011/0199199 A1* | 8/2011 | Perkins | B60Q 1/506 340/435 |
| 2011/0205042 A1* | 8/2011 | Takemura | G08G 1/166 340/435 |
| 2011/0246156 A1* | 10/2011 | Zecha | G08G 1/166 703/6 |
| 2012/0025964 A1* | 2/2012 | Beggs | B60Q 1/2673 340/435 |
| 2012/0072087 A1* | 3/2012 | Wu | B60Q 1/54 701/70 |
| 2012/0206597 A1* | 8/2012 | Komoto | G06K 9/00805 348/135 |
| 2013/0229289 A1* | 9/2013 | Bensoussan | B60Q 5/006 340/902 |
| 2013/0329960 A1* | 12/2013 | Sandahl | G06K 9/00791 382/104 |
| 2014/0032093 A1* | 1/2014 | Mills | B60W 40/107 701/301 |
| 2014/0051346 A1* | 2/2014 | Li | H04W 4/046 455/3.01 |
| 2014/0056438 A1* | 2/2014 | Baalu | B60Q 5/008 381/86 |
| 2014/0062685 A1* | 3/2014 | Tamatsu | B60Q 5/005 340/425.5 |
| 2014/0112538 A1* | 4/2014 | Ogawa | G08G 1/166 382/103 |
| 2014/0214260 A1* | 7/2014 | Eckert | B60Q 1/488 701/28 |
| 2014/0240113 A1* | 8/2014 | Pottier | B60Q 1/26 340/432 |
| 2015/0035685 A1* | 2/2015 | Strickland | B60Q 9/008 340/901 |
| 2015/0054642 A1* | 2/2015 | Carruthers | B60Q 5/008 340/463 |
| 2015/0103159 A1* | 4/2015 | Shashua | G06K 9/00798 348/118 |
| 2015/0127222 A1* | 5/2015 | Cunningham, III | B60R 1/00 701/41 |
| 2015/0151725 A1* | 6/2015 | Clarke | B60W 30/00 701/28 |
| 2015/0191117 A1* | 7/2015 | Arita | B60Q 5/008 340/435 |
| 2015/0197185 A1* | 7/2015 | Jones | B60Q 1/50 340/468 |
| 2015/0203023 A1* | 7/2015 | Marti | B60Q 1/00 340/425.5 |
| 2015/0210279 A1* | 7/2015 | Agnew | B60W 30/09 701/48 |
| 2015/0228195 A1* | 8/2015 | Beaurepaire | G08G 1/0962 340/907 |
| 2015/0234045 A1* | 8/2015 | Rosenblum | G01S 13/931 342/71 |
| 2015/0269925 A1* | 9/2015 | Kanaya | B60Q 5/008 381/71.4 |
| 2015/0329043 A1* | 11/2015 | Skvarce | B60Q 9/008 340/435 |
| 2015/0331422 A1* | 11/2015 | Hartung | G05D 1/021 701/23 |
| 2015/0332114 A1* | 11/2015 | Springer | G06K 9/4604 348/148 |
| 2015/0336502 A1* | 11/2015 | Hillis | B60Q 1/26 701/23 |
| 2015/0336547 A1* | 11/2015 | Dagan | B60T 7/22 701/70 |
| 2016/0075332 A1* | 3/2016 | Edo-Ros | B60W 30/0956 701/70 |
| 2016/0121791 A1* | 5/2016 | Shimizu | G08G 1/166 340/435 |
| 2016/0132705 A1* | 5/2016 | Kovarik | G06K 7/10376 340/10.3 |
| 2016/0163198 A1* | 6/2016 | Dougherty | G08G 1/162 340/905 |
| 2016/0167648 A1* | 6/2016 | James | B60Q 1/503 701/28 |
| 2016/0207454 A1* | 7/2016 | Cuddihy | G08B 6/00 |
| 2016/0229397 A1* | 8/2016 | Muthukumar | B60R 21/013 |
| 2016/0231746 A1* | 8/2016 | Hazelton | G05D 1/0257 |
| 2016/0232423 A1* | 8/2016 | Zhong | G06K 9/52 |
| 2016/0250963 A1 | 9/2016 | Reuschel et al. | |
| 2017/0123434 A1* | 5/2017 | Urano | B60Q 9/008 |
| 2017/0166222 A1* | 6/2017 | James | B60W 50/14 |
| 2017/0282784 A1* | 10/2017 | Foster | A01B 76/00 |

\* cited by examiner

APPARATUS AND METHOD FOR IDENTIFYING A DRIVING STATE OF AN UNMANNED VEHICLE AND UNMANNED VEHICLE

CROSS-REFERENCE TO RELATED APPLICATION

This application is related to and claims priority from Chinese Application No. 201611199483.8, filed on Dec. 22, 2016, entitled "Apparatus and Method for Identifying a Driving State of an Unmanned Vehicle and Unmanned Vehicle" the entire disclosure of which is hereby incorporated by reference.

TECHNICAL FIELD

The present disclosure relates to the field of unmanned vehicle technology, specifically to an apparatus and a method for identifying a driving state of an unmanned vehicle. The present disclosure also relates to a unmanned vehicle possessing the apparatus for identifying a driving state of the unmanned vehicle.

BACKGROUND

With the increasing research on unmanned vehicle technology and the development of the industry, unmanned vehicles will travel on the public road in the near future. In the early days of the unmanned vehicle age, it is inevitable that unmanned vehicles and ordinary traditional vehicles will co-exist at the same time, and the traditional vehicles and unmanned vehicles will run together on the public road. Then, the driver driving a traditional vehicle or the pedestrian needs to be able to quickly identify the unmanned vehicle and whether the unmanned vehicle is in a manual state. This leaves the driver and the pedestrian longer predicting time so as to avoid unnecessary traffic accidents and damages.

SUMMARY

In view of the above-mentioned drawbacks or deficiencies in the prior art, the present disclosure desires to provide a solution for quickly identifying driving state of a unmanned vehicle.

In a first aspect, the present disclosure embodiment provides an apparatus for identifying a driving state of an unmanned vehicle, the apparatus comprising: an information analyzing apparatus, configured to receive information of an operating system of the unmanned vehicle, and determine and transmit a corresponding driving state signal based on the information; and a display apparatus, configured to receive the driving state signal transmitted from the information analyzing apparatus and display the driving state signal.

In a second aspect, the present disclosure embodiment also provides a method for identifying a driving state of an unmanned vehicle, the method comprising: receiving information of an operating system of the unmanned vehicle and decoding the information; processing the decoded information, converting the information into a corresponding driving state signal and transmitting the same; and receiving and displaying the driving state signal of the unmanned vehicle.

In a third aspect, the present disclosure embodiment also provides a unmanned vehicle possessing the driving state identifying apparatus.

The apparatus for identifying a driving state of an unmanned vehicle provided by the embodiments of the present disclosure fully considers the driving conditions of various vehicles on the road and displays the driving state of the unmanned vehicle in an intuitive and eye-catching manner to the surrounding vehicles and pedestrians by the information analyzing apparatus and the display apparatus, improves the safety performance of road driving, and is simple in structure, easy to install, low in cost, suitable for mass promotion and use.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

Figure 1:
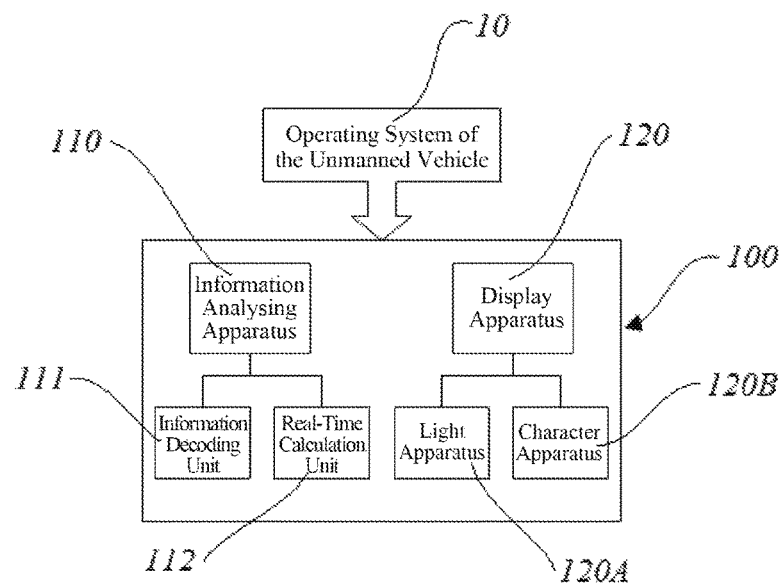
FIG. 1 shows an exemplary system architecture of an apparatus for identifying a driving state of an unmanned vehicle according to an embodiment of the present disclosure.
Figure 2:
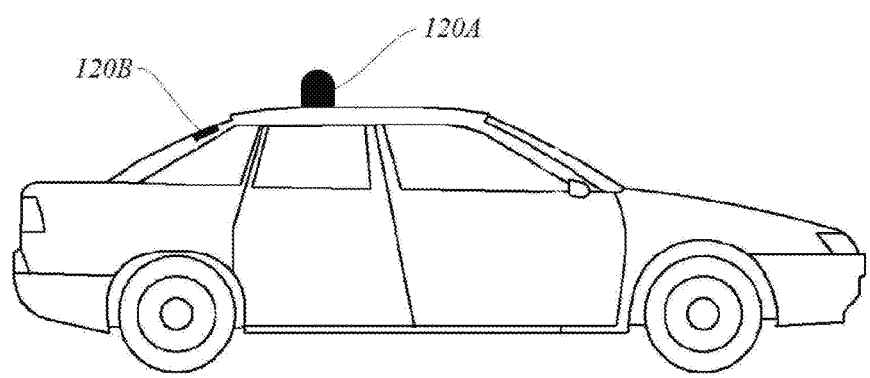
FIG. 2 shows a schematic structure diagram of the apparatus for identifying a driving state of an unmanned vehicle according to an embodiment of the present disclosure.

FIG. 1 shows an exemplary system architecture of a unmanned vehicle driving state identifying apparatus of an embodiment of the present disclosure, FIG. 2 shows a schematic structure diagram of the apparatus for identifying a driving state of an unmanned vehicle according to an embodiment of the present disclosure.

As shown in FIG. 1, the apparatus 100 for identifying a driving state of an unmanned vehicle may include an information analyzing apparatus 110 and a display apparatus 120.

The information analyzing apparatus 110 is configured to receive information of an operating system 10 of the unmanned vehicle, and determine and transmit a corresponding driving state signal based on the information.

Specifically, the information analyzing apparatus 110 includes an information decoding unit 111 and a real-time calculation unit 112. The information decoding unit 111 is configured to receive information of the operating system 10 of the unmanned vehicle and decode the information. The real-time calculation unit 112 processes the information decoded by the information decoding unit 111, converts the information into a corresponding driving state signal and transmits it. The driving state signal may be represented numerically. For example, if the driving state is autopilot, the transmitting signal is "1", and if the driving state is manual driving, the transmitting signal is "0". The driving state signal may also be represented using encrypted communication message converted into characters.

The display apparatus 120 is configured to receive the driving state signal transmitted from the information analyzing apparatus 110 and display the driving state signal, so that the driver driving the traditional vehicle or the pedestrian can quickly identify the unmanned vehicle and its driving state.

As shown in FIG. 2, the display apparatus 120 may include a light apparatus 120A set on the top of the unmanned vehicle. After the light apparatus 120A receives the driving state signal transmitted by the information analyzing apparatus 110, the current driving state of the unmanned vehicle may be displayed by the color change of the light apparatus 120A.

Further, the light apparatus 120A includes a light emitting device and a base supporting the light emitting device. The base is fixed to the top of the unmanned vehicle, and the light emitting device is for emitting light of different colors. For example, when the light emitting device receives a signal "1" transmitted from the information analyzing apparatus 110, it emits red light indicating that the unmanned vehicle is currently in an automatic driving state. When the light emitting device receives a signal "0" transmitted from the information analyzing apparatus 110, it emits green light indicating that the unmanned vehicle is currently in a manual driving state.

The display apparatus 120 may further include a character apparatus 120B set on the rear glass of the unmanned vehicle. After the character apparatus 120B receives the driving state signal transmitted from the information analyzing apparatus 110, the current driving state of the unmanned vehicle may be displayed through the characters.

Further, the character apparatus 120B includes a base plate and light emitting diodes. The base plate is fixed inside the rear glass of the unmanned vehicle, and the light emitting diodes are mounted on the base plate for displaying the character content representing the current driving state of the unmanned vehicle. For example, after the light emitting diodes receive an encrypted communication message transmitted from the information analyzing apparatus 110 and converted into a character displayed as "automatic", it indicates that the unmanned vehicle is currently in an automatic driving state. After the light emitting diodes receive an encrypted communication message transmitted from the information analyzing apparatus 110 and converted into a character displayed as "manual", it indicates that the unmanned vehicle is currently in a manual driving state.

The character content representing the driving state of the unmanned vehicle is only for exemplary purpose and is not limited thereto. In addition, the character content displayed by the light emitting diodes may be in Chinese, English or any one or a combination of a few of other languages, depending on the location and language environment of the unmanned vehicle.

It should be noted that the display apparatus 120 may be used by combining the light apparatus 120A and the character apparatus 120B, or only of the above is used alone to display the driving state of the unmanned vehicle.

The apparatus 100 for identifying a driving state of an unmanned vehicle provided by the embodiments of the present disclosure fully considers the driving conditions of various vehicles on the road and displays the driving state of the unmanned vehicle in an intuitive and eye-catching manner to the surrounding vehicles and pedestrians by the information analyzing apparatus 110 and the display apparatus 120, improves the safety performance of road driving, and is simple in structure, easy to install, low in cost, suitable for mass promotion and use.

Figure 3:
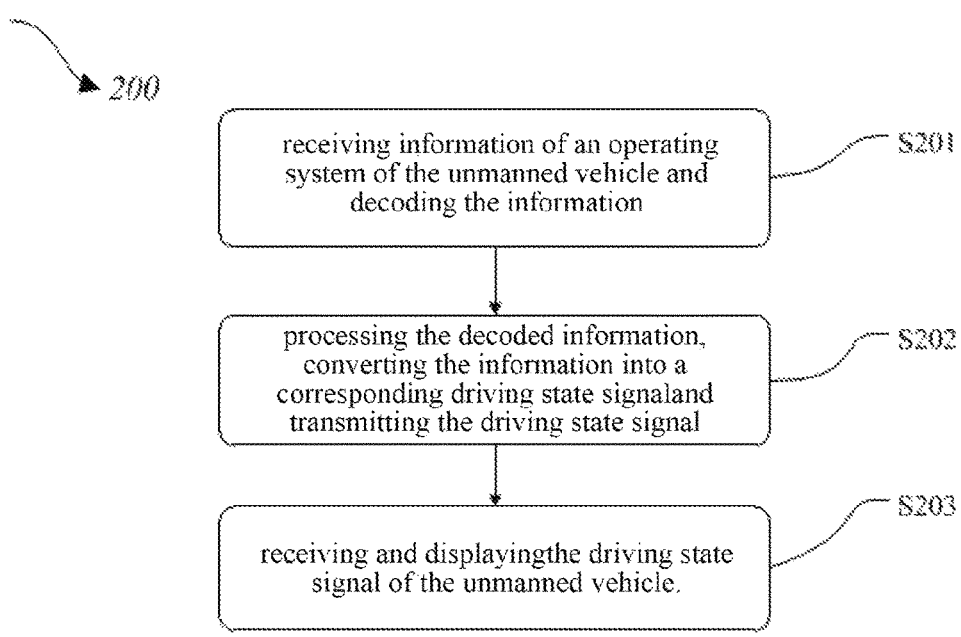
FIG. 3 shows an exemplary flowchart of a method for identifying a driving state of an unmanned vehicle according to an embodiment of the present disclosure.

FIG. 3 shows an exemplary flowchart of a method for identifying a driving state of an unmanned vehicle according to an embodiment of the present disclosure.

As shown in FIG. 3, the method 200 includes the following steps:

Step 201: receiving information of an operating system of the unmanned vehicle and decoding the information;

Step 202: processing the decoded information, converting the information into a corresponding driving state signal and transmitting; and Step 203: receiving and displaying the driving state signal of the unmanned vehicle.

In the above step S203, the driving state signal of the unmanned vehicle is displayed by the color change of the light emitting device and/or the character content of the character apparatus as described above, therefore detailed description thereof is omitted.

In addition, the present disclosure embodiment also provides an apparatus 100 for identifying a driving state of an unmanned vehicle.

The flowcharts and block diagrams in the accompanying figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flowcharts and/or a combination of the blocks may be implemented by a dedicated hardware-based system executing specific functions or operations, or by a combination of a dedicated hardware and computer instructions.

The units or modules involved in the embodiments of the present disclosure may be implemented by way of software or hardware. The described units or modules may also be provided in a processor. The names of these units or modules do not in any case constitute a limitation to the unit or module itself.

In another aspect, the present disclosure further provides a computer-readable storage medium. The computer-readable storage medium may be the computer-readable storage medium included in the apparatus in the above embodiments, or a stand-alone computer-readable storage medium which has not been assembled into the apparatus. The computer-readable storage medium stores one or more programs. The programs are used by one or more processors to perform the method for identifying a driving state of an unmanned vehicle described in the present disclosure.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An apparatus for identifying a driving state of an unmanned vehicle, the apparatus comprising:
   an information analyzing apparatus, configured to receive information of an operating system of the unmanned vehicle, and determine and transmit a corresponding driving state signal based on the information; and
   a display apparatus, configured to receive the driving state signal transmitted from the information analyzing apparatus and display the driving state signal;
   wherein the display apparatus comprises a character apparatus provided on a rear glass of the unmanned vehicle, the character apparatus configured to display a current driving state of the unmanned vehicle through characters after receiving the driving state signal transmitted by the information analyzing apparatus, the current driving state of the unmanned vehicle comprising an automatic driving state or a manual driving state;
   wherein the character apparatus comprises a base plate and light emitting diodes, the base plate fixed inside the rear glass of the unmanned vehicle, and the light emitting diodes mounted on the base plate and configured to display character content representing the current driving state of the unmanned vehicle.

2. The apparatus according to claim 1, wherein the information analyzing apparatus comprises:
   at least one processor; and
   a memory storing instructions, the instructions when executed by the at least one processor, cause the at least one processor to perform operations, the operations comprising:
   receiving the information of the operating system of the unmanned vehicle;
   decoding the information;
   converting the information into a corresponding driving state signal; and
   transmitting the driving state signal.

3. The apparatus according to claim 1, wherein the display apparatus further includes a light apparatus provided on top of the unmanned vehicle, the light apparatus configured to display the current driving state of the unmanned vehicle with color changes of the light apparatus after receiving the driving state signal transmitted by the information analyzing apparatus.

4. The apparatus according to claim 3, wherein the light apparatus includes a light emitting device and a base supporting the light emitting device, the base is fixed to a top of the unmanned vehicle, and the light emitting device is configured to emit emitting light of different colors.

5. The apparatus according to claim 4, wherein the light emitting device is configured to indicate that the unmanned vehicle is currently in the automatic driving state by emitting red light, and the light emitting device is configured to indicate that the unmanned vehicle is currently in the manual driving state by emitting green light.

6. The apparatus according to claim 1, wherein the character content displayed by the light emitting diodes of the character apparatus is in a language comprising at least one of Chinese or English.

7. An unmanned vehicle, comprising the apparatus for identifying a driving state of an unmanned vehicle according to claim 1.

8. A method for identifying an unmanned vehicle driving state, the method comprising:
   receiving information of an operating system of the unmanned vehicle and decoding the information;
   processing the decoded information, converting the decoded information into a corresponding driving state signal and transmitting the driving state signal; and
   receiving and displaying the driving state signal of the unmanned vehicle,
   wherein the driving state signal of the unmanned vehicle is displayed with a character content of a character apparatus provided on a rear glass of the unmanned vehicle, the driving state signal of the unmanned vehicle comprising an automatic driving state or a manual driving state;
   wherein the character apparatus comprises a base plate and light emitting diodes, the base plate fixed inside the rear glass of the unmanned vehicle, and the light emitting diodes mounted on the base plate and configured to display character content representing the current driving state of the unmanned vehicle.

9. The method according to claim 8, wherein the driving state signal of the unmanned vehicle is displayed with color changes of a light emitting device.

10. A non-transitory computer storage medium storing a computer program, which when executed by one or more processors, causes the one or more processors to perform operations, the operations comprising:
    receiving information of an operating system of the unmanned vehicle and decoding the information;
    processing the decoded information, converting the decoded information into a corresponding driving state signal and transmitting the driving state signal; and
    receiving and displaying the driving state signal of the unmanned vehicle,
    wherein the driving state signal of the unmanned vehicle is displayed with a character content of a character apparatus provided on a rear glass of the unmanned vehicle, the driving state signal of the unmanned vehicle comprising an automatic driving state or a manual driving state;
    wherein the character apparatus comprises a base plate and light emitting diodes, the base plate fixed inside the rear glass of the unmanned vehicle, and the light emitting diodes mounted on the base plate and configured to display character content representing the current driving state of the unmanned vehicle.

11. The non-transitory computer storage medium according to claim 10, wherein the driving state signal of the unmanned vehicle is displayed with color changes of a light emitting device.

* * * * *